United States Patent
Niles

(12) United States Patent (10) Patent No.: US 10,643,027 B2
Niles (45) Date of Patent: May 5, 2020

(54) CUSTOMIZING A COMMON TAXONOMY WITH VIEWS AND APPLYING IT TO BEHAVIORAL TARGETING

(71) Applicant: Microsoft Corporation, Redmond, WA (US)

(72) Inventor: Ian Harcourt Niles, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 907 days.

(21) Appl. No.: 13/796,987

(22) Filed: Mar. 12, 2013

(65) Prior Publication Data
US 2014/0280171 A1 Sep. 18, 2014

(51) Int. Cl.
| | |
|---|---|
| G06F 16/00 | (2019.01) |
| G06F 40/20 | (2020.01) |
| G06F 16/332 | (2019.01) |
| G06F 16/9032 | (2019.01) |
| G06F 16/954 | (2019.01) |

(52) U.S. Cl.
CPC .......... *G06F 40/20* (2020.01); *G06F 16/3323* (2019.01); *G06F 16/90328* (2019.01); *G06F 16/954* (2019.01)

(58) Field of Classification Search
CPC ....................... G06F 17/2785; G06F 17/30707
USPC ......................................................... 707/740
See application file for complete search history.

(56) References Cited

U.S. PATENT DOCUMENTS

| | | | | |
|---|---|---|---|---|
| 6,055,515 A | * | 4/2000 | Consentino | G06F 3/0481 705/27.1 |
| 6,085,187 A | * | 7/2000 | Carter | G06F 17/30398 |
| 6,360,216 B1 | * | 3/2002 | Hennessey | G06F 17/30392 |
| 6,466,918 B1 | * | 10/2002 | Spiegel | G06F 17/30873 705/27.1 |

(Continued)

OTHER PUBLICATIONS

Quam, Eileen, "Integrating Taxonomies in the State of Minnesota", Published on: Oct. 2002, Available at: http://www.montague.com/abstracts/quam.html.

(Continued)

*Primary Examiner* — Son T Hoang
(74) *Attorney, Agent, or Firm* — Shook, Hardy & Bacon L.L.P.

(57) ABSTRACT

Systems, methods, and computer-readable storage media are provided for generating a taxonomic view from a standard taxonomy and generating audience segments for targeting using a formal grammar. A manually-tagged subset of categories of the standard taxonomy is provided to a server. Each category in the subset of categories is tagged based on an entity's own legacy taxonomy. A taxonomy slicer is applied to the subset of manually-tagged categories to determine parent/child relationships for each category in the subset, and to assemble the categories into the taxonomic view. The taxonomic view maintains interoperability with the standard taxonomy, and with other entities using views of the standard taxonomy. Further, a formal grammar is defined for specifying online behaviors for targeting, and is applied to extracted categories of the standard taxonomy and/or taxonomic view. The formal grammar may be programmatically applied during behavioral targeting.

20 Claims, 4 Drawing Sheets

(56) References Cited

U.S. PATENT DOCUMENTS

| | | | |
|---|---|---|---|
| 6,625,619 B1* | 9/2003 | McClendon | G06F 17/30873 |
| 8,050,965 B2 | 11/2011 | Hellevik et al. | |
| 2001/0044758 A1* | 11/2001 | Talib | G06F 17/30622 |
| | | | 705/26.1 |
| 2002/0077921 A1* | 6/2002 | Morrison | G06Q 30/02 |
| | | | 705/26.1 |
| 2002/0133392 A1* | 9/2002 | Angel | G06F 17/3089 |
| | | | 705/7.39 |
| 2002/0143669 A1* | 10/2002 | Scheer | G06Q 10/087 |
| | | | 705/28 |
| 2003/0061122 A1* | 3/2003 | Berkowitz | G06F 17/30873 |
| | | | 705/26.35 |
| 2003/0182196 A1* | 9/2003 | Huang | G06Q 30/02 |
| | | | 705/26.64 |
| 2004/0143584 A1* | 7/2004 | Chun | G06F 17/3089 |
| 2007/0265999 A1 | 11/2007 | Amitay et al. | |
| 2008/0040362 A1* | 2/2008 | Aucouturier | G06F 16/68 |
| 2011/0015990 A1 | 1/2011 | Sanghavi et al. | |
| 2011/0055009 A1* | 3/2011 | Kiveris | G06F 17/30867 |
| | | | 705/14.52 |
| 2011/0112900 A1 | 5/2011 | Sanghavi | |
| 2011/0295895 A1* | 12/2011 | Musgrove | G06F 17/30327 |
| | | | 707/777 |
| 2012/0116882 A1 | 5/2012 | Sanghavi et al. | |
| 2012/0271825 A1* | 10/2012 | Garthwaite | G06F 17/30817 |
| | | | 707/736 |

OTHER PUBLICATIONS

Pandey, et al., "Learning to Target: What Works for Behavioral Targeting" In Proceedings of the 20th ACM international conference on Information and Knowledge Management, Oct. 24, 2011, 10 pages.

Englmeier, et al., "Adapting the Communication Capacity of Web Services to the Language of their User Community" In Proceedings of the IEEE International Conference on Web Services , Jun. 6, 2004, 9 pages.

"Networks & Exchanges Quality Assurance Guidelines", Published on: Jun. 2010, Available at: http://www.iab.net/media/file/NE-QA-Guidelines-Final-Release-0610.pdf.

"Automatic Classification and Taxonomy Generation", Retrieved on: Feb. 6, 2013, Available at: http://www.autonomy.com/content/Functionality/idol-functionality-categorization/index.en.html.

"Applications for eTaxonomy", Published on: Nov. 2, 2010, Available at: http://www.earley.com/blog/applications-etaxonomy.

"Large-Scale Behavioral Targeting with a Social Twist", Published on: Sep. 8, 2012, Available at: http://behavioraltargeting.biz/large-scale-behavioral-targeting-with-a-social-twist/.

* cited by examiner

CUSTOMIZING A COMMON TAXONOMY WITH VIEWS AND APPLYING IT TO BEHAVIORAL TARGETING

BACKGROUND

Standard taxonomies are presently used to facilitate communication within an entity and between multiple entities and/or applications by providing a controlled language for defining a particular domain. Such standard taxonomies are often very large, providing an extensive number of categories, descriptors, subcategories, and the like. As such, not all of the categories in a standard taxonomy may be needed by an entity accessing the standard taxonomy, and even a well-defined subset of categories, such as all categories in a given branch of the standard taxonomy, may not be adequate for a particular application.

For example, a standard taxonomy may be used to define a domain for e-commerce, a domain for manufacturing, a domain for media products, and various other particular domains. Such a standard taxonomy may also be accessed so that different entities can communicate with each other. In other words, the standard taxonomy provides a standard and/or common language for communicating effectively and efficiently between different entities and/or applications. However, when different entities/applications are utilizing the same standard taxonomy, only a small portion of the standard taxonomy may be relevant to the entity/application. This is typically addressed by using a query language that allows the entity to retrieve/access a particular, well-defined branch of the taxonomy. For example, an entity may select branch "A" and every category under branch "A" in the taxonomy, while ignoring branches "B" and "C." In another approach, an entity may select a well-defined level in a taxonomy, such as selecting every category in a particular tier of the taxonomy. However, these approaches are ineffective when an entity prefers to specifically select individual, relevant categories in the standard taxonomy, rather than select a well-defined branch or well-defined level of the taxonomy. As such, no mechanism has been provided to individually select categories and reassemble them into a self-standing hierarchy, which is consistent with the overarching, standard taxonomy.

In addition to including categories that are not relevant to a particular entity's requirements, standard taxonomies often fail to include beneficial categories for identifying specific audience segments. During audience and/or behavioral targeting, standard taxonomy categories incompletely specify an audience segment (e.g. the categories specify the topic of interest without indicating a user's intent vis-à-vis the topic). Often times the categories in the standard taxonomy are manually supplemented with additional information to create more specific targeting segments, as the categories in the standard taxonomy only provide limited information with respect to an audience segment. In one example, a taxonomy used to create audience targeting segments may provide a category, such as "used cars," without providing an indication of intent for that category, such as purchasing a used car or researching used cars. As such a user may be categorized according to the audience segment for "used cars" without insight into the user's individual intent. Further, manual intervention may be used to determine how a particular audience segment corresponds to a class of users in the online environment.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for generating a taxonomic view from a standard taxonomy and generating audience segments for targeting using a formal grammar. In one embodiment, an entity requesting a taxonomic view of a standard taxonomy provides a manually-tagged subset of categories of the standard taxonomy to a server that accesses the standard taxonomy from a database. Each category in the subset of categories is tagged based on the entity's own legacy taxonomy, such as the entity's product catalog. Each category in the legacy taxonomy corresponds to a category in the standard taxonomy, but not all categories in the standard taxonomy are tagged by the entity, as the subset of categories includes some but not all of the categories in the standard taxonomy.

A "taxonomy slicer" is then applied to the subset of manually-tagged categories to generate the taxonomic view. In some embodiments, the role of the taxonomy slicer is to reassemble a view of the standard taxonomy that includes only those categories that were tagged, as well as determine a relationship for each of the plurality of categories in the subset of categories based on a relationship for each of the categories in the standard taxonomy. In doing so, the taxonomy slicer determines a relationship for each of the plurality of categories in the subset of categories by assigning a parent/child relationship between each of the plurality of categories in the subset of categories and at least one other category in the subset of categories. By basing these relationships on the previous relationship of the tagged categories when in the standard taxonomy, relationships in the standard taxonomy where meaning is inherited from one category to the other are preserved in the taxonomic view. Accordingly, the taxonomic view maintains interoperability with the standard taxonomy. The taxonomic view determined using the taxonomy slicer may then be communicated to the entity that provided the tagged subset of categories derived from the standard taxonomy.

In further embodiments of the invention, a formal grammar is defined for specifying online behaviors for targeting. While using a taxonomy to provide relevant descriptors for targeting, the formal grammar determines combinations of descriptors that exhaustively specify users according to satisfying one or more categories in the taxonomy. As such, in one embodiment, a plurality of audience segments is determined based on applying a formal grammar to a taxonomy. Having extracted a plurality of categories from the taxonomy, a formal grammar is applied to the extracted plurality of categories to determine one or more audience segments. The formal grammar comprises one or more rules for interpreting the relationships between two or more categories from the taxonomy, e.g., in some cases the relationship between two categories from the taxonomy could be interpreted as set intersection. The audience segments may then be programmatically applied during behavioral targeting. In one embodiment, the audience segments are determined based on applying the formal grammar to the standard taxonomy, while in another embodiment, the taxonomic view is generated from a subset of categories in the standard taxonomy.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
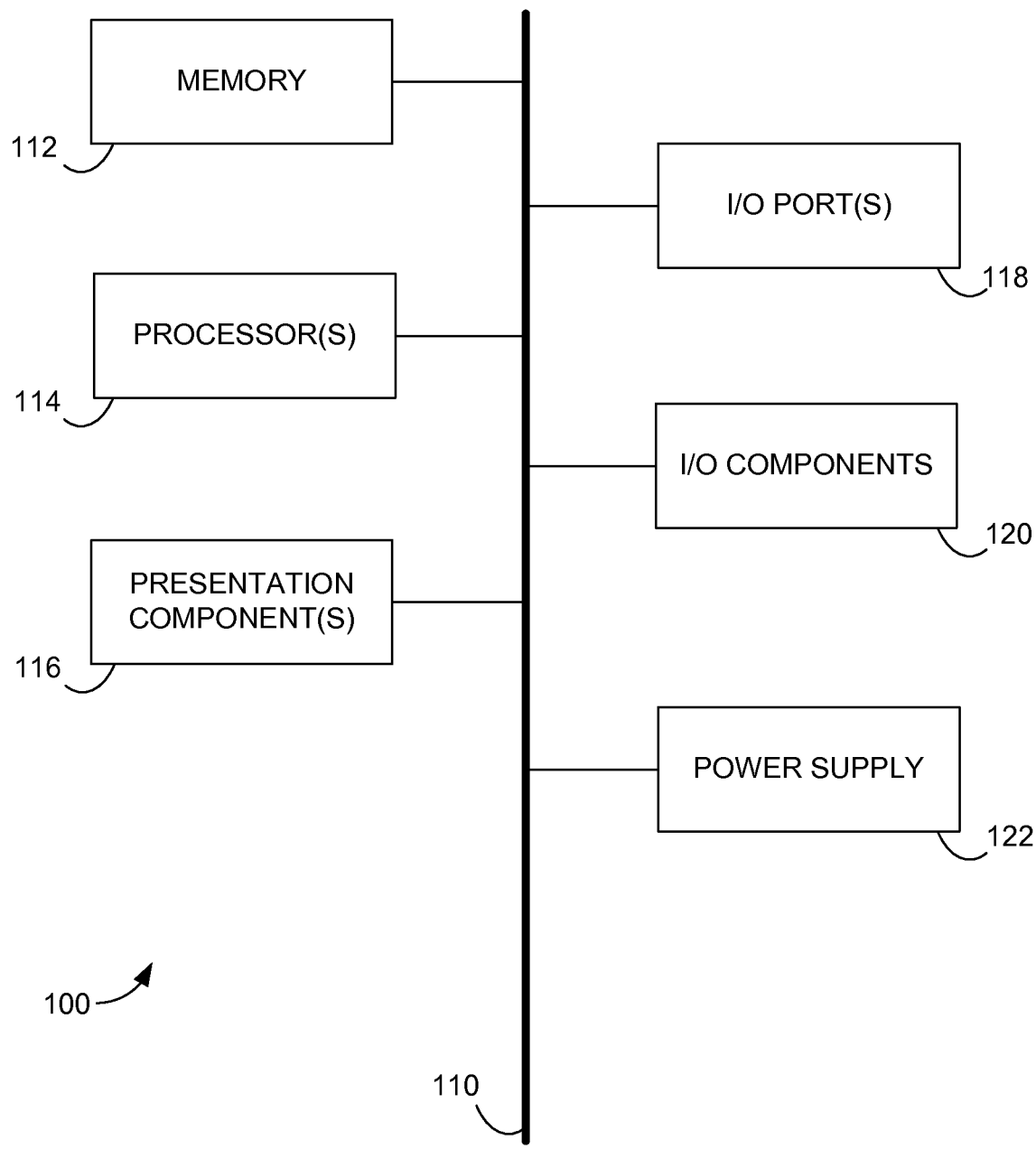
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

In various embodiments, systems, methods, and computer-readable storage media are provided for generating a taxonomic view from a standard taxonomy and generating audience segments for targeting using a formal grammar. In one embodiment, an entity requesting a taxonomic view of a standard taxonomy provides a manually-tagged subset of categories of the standard taxonomy to a server that accesses the standard taxonomy from a database. Each category in the subset of categories is tagged based on the entity's own legacy taxonomy, such as the entity's product catalog. Each category in the legacy taxonomy corresponds to a category in the standard taxonomy, but not all categories in the standard taxonomy are tagged by the entity, as the subset of categories includes some but not all of the categories in the standard taxonomy.

A "taxonomy slicer" is then applied to the subset of manually-tagged categories to generate the taxonomic view. In some embodiments, the role of the taxonomy slicer is to reassemble a view of the standard taxonomy that includes only those categories that were tagged, as well as determine a relationship for each of the plurality of categories in the subset of categories based on a relationship for each of the categories in the standard taxonomy. In doing so, the taxonomy slicer determines a relationship for each of the plurality of categories in the subset of categories by assigning a parent/child relationship between each of the plurality of categories in the subset of categories and at least one other category in the subset of categories. By basing these relationships on the previous relationship of the tagged categories when in the standard taxonomy, relationships in the standard taxonomy where meaning is inherited from one category to the other are preserved in the taxonomic view. Accordingly, the taxonomic view maintains interoperability with the standard taxonomy. The taxonomic view determined using the taxonomy slicer may then be communicated to the entity that provided the tagged subset of categories derived from the standard taxonomy.

In further embodiments of the invention, a formal grammar is defined for specifying online behaviors for targeting. While using a taxonomy to provide relevant descriptors for targeting, the formal grammar determines combinations of descriptors that exhaustively specify users according to satisfying one or more categories in the taxonomy. As such, in one embodiment, a plurality of audience segments is determined based on applying a formal grammar to a taxonomy. Having extracted a plurality of categories from the taxonomy, a formal grammar is applied to the extracted plurality of categories to determine one or more audience segments. The formal grammar comprises one or more rules for interpreting the relationships between two or more categories from the taxonomy, e.g., in some cases the relationship between two categories from the taxonomy could be interpreted as set intersection. The audience segments may then be programmatically applied during behavioral targeting. In one embodiment, the audience segments are determined based on applying the formal grammar to the standard taxonomy, while in another embodiment, the taxonomic view is generated from a subset of categories in the standard taxonomy.

Accordingly, one embodiment of the present invention is directed to one or more computer-readable storage media storing computer-useable instructions that, when used by one or more computing devices, cause the one or more computing devices to perform a method for generating a taxonomic view of a standard taxonomy. The method comprises receiving a manually-tagged subset of categories of a standard taxonomy, wherein each of a plurality of categories in the subset of categories is tagged based on an entity. The method further comprises applying a taxonomy slicer to the manually-tagged subset, and generating a taxonomic view of the standard taxonomy.

In another embodiment, the present invention is directed to one or more computer-readable storage media storing computer-useable instructions that, when used by one or more computing devices, cause the one or more computing devices to perform a method for applying a formal grammar to define audience segments. The method comprises extracting a plurality of categories from a taxonomy, and applying a formal grammar to the extracted plurality of categories to determine one or more audience segments, wherein the formal grammar comprises one or more rules for interpreting the relationships between two or more categories from the taxonomy.

In yet another embodiment, the present invention is directed to a system including a server having one or more processors and one or more computer-readable storage media, and a data store coupled with the server. The server is configured to receive a manually-tagged subset of categories of a standard taxonomy, wherein each of a plurality of categories in the subset of categories is tagged by an entity. The server is further configured to apply a taxonomy slicer to the manually-tagged subset to generate a taxonomic view of the standard taxonomy.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventor hereof recognizes that such is the nature of the art, and reiterates that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media; computer storage media excluding signals per se. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100.

Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like.

A NUI processes air gestures, voice, or other physiological inputs generated by a user. These inputs may be interpreted as search prefixes, search requests, requests for interacting with intent suggestions, requests for interacting with entities or subentities, or requests for interacting with advertisements, entity or disambiguation tiles, actions, search histories, and the like presented by the computing device 100. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 100. The computing device 100 may be equipped with depth cameras, such as, stereoscopic camera systems, infrared camera systems, RGB camera systems, and combinations of these for gesture detection and recognition. Additionally, the computing device 100 may be equipped with accelerometers or gyroscopes that enable detection of motion. The output of the accelerometers or gyroscopes is provided to the display of the computing device 100 to render immersive augmented reality or virtual reality.

Aspects of the subject matter described herein may be described in the general context of computer-executable instructions, such as program modules, being executed by a computing device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

As previously mentioned, embodiments of the present invention are generally directed to systems, methods, and computer-readable storage media for generating a taxonomic view from a standard taxonomy and generating audience segments for targeting using a formal grammar. In embodiments, a taxonomic view comprises an arbitrarily-tagged subset of categories from a standard and/or common taxonomy. The arbitrarily-tagged subset of categories is reassembled according to rules executed by a taxonomy slicer in a way that is consistent with the standard taxonomy. In some embodiments, for the taxonomic view to be consistent with the standard taxonomy, all of the categories in the tagged subset are connected up with a closest parent or ancestor within the standard taxonomy. For example, when tagging an arbitrary subset of categories, it may happen that a grandparent of a category is included, but not the parent of the category. In other words, some categories in a branch of the taxonomy may be skipped. An entity may tag category A and category C, but skip tagging category B in the standard taxonomy. As such, a taxonomic view may then be generated, consistent with the standard taxonomy, which connects category A to category C based on the fact that A is the parent of B and B is the parent of C in an overarching standard taxonomy. In embodiments, a taxonomy slicer is used to apply a set of rules to the categories tagged from a standard taxonomy. For example, a taxonomy slicer may apply a set of rules to tagged categories A and C to establish a direct relationship between the two categories in the taxonomic view. As such, application of the taxonomic view rules by the taxonomy slicer may ensure that every tagged category within the taxonomic view has a parent, and that the parent is the tagged category's closest ancestor.

In embodiments, the tagging of individual categories in a standard taxonomy is a manual process, requiring user intervention to indicate which categories in a taxonomy are most relevant to the user. Once all the desired tags are assigned, a taxonomy slicer retrieves and/or extracts all of the tagged categories and applies a set of rules to the tagged categories to identify relationships between the tagged categories for the taxonomic view. The relationships between the tagged categories in the taxonomic view are consistent with the relationships between the categories as part of the original, standard taxonomy. For example, given a parent category A, a child category B, and a grandchild category C in the standard taxonomy, upon tagging of categories A and C (and supposing that category B is not tagged), the taxonomy slicer may establish a parent/child relationship between categories A and C when generating the taxonomic view.

As such, the taxonomy slicer may determine a particular set of tagged categories and assign relationships (e.g., parent/child) based on the relationships in the standard taxonomy (parent/child or ancestor/child) such that every tagged category is connected to at least one parent. In embodiments, when establishing relationships consistent with the standard taxonomy, the taxonomy slicer determines the closest ancestor to the tagged category, which is also tagged. In further embodiments, a taxonomic view may be created from a polyhierarchical taxonomy, where individual categories may have more than one parent. In that example, if a tagged category has multiple potential parents in establishing the taxonomic view, the taxonomy slicer may establish multiple parent relationships in the taxonomic view. In embodiments, the taxonomy slicer programmatically determines a taxonomic view of the manually tagged, arbitrarily-selected categories from the standard taxonomy.

In one example, a standard taxonomy may include a path of categories including computers/computer systems/personal computers/laptops. During tagging, a user may select computers, personal computers, and laptops, without tagging computer systems. Accordingly, in one embodiment, the taxonomy slicer eliminates a missing level of the taxonomic view for computer systems by creating a direct parent/child relationship between computers and personal computers in the view.

In further embodiments, once the taxonomic view is created, the taxonomy slicer may export the taxonomic view for delivery to an entity. For example, the taxonomy slicer may export the taxonomic view in a particular file format, such as a CSV file and/or a tab-delimited text file, for delivery to the entity. In some embodiments, an entity may want to consume the taxonomic view with the labels of each tagged category expressed in a different way. Such a taxonomic view may be adjusted to include supplemental naming of individual categories with private labels, given that categories in the standard taxonomy are keyed to alphanumeric identifiers for individual categories. The alphanumeric identifiers allow interoperability between the view and the standard taxonomy to be maintained. In further embodiments, the taxonomic view includes the naming conventions of the standard taxonomy.

In embodiments, a standard taxonomy provides a single repository with a single way of representing a domain, and may be accessible by multiple entities. Each entity may generate at taxonomic view of the standard taxonomy that is relevant to the entity. As used herein, an entity may refer to an application, an organization, an agent, a person, and the like. As previously discussed, a standard taxonomy may have any number of categories, but not all of the categories in the standard taxonomy may be relevant to a particular entity, such as a particular application accessing information from the standard taxonomy. For example, a standard taxonomy may be accessed when defining audience segments and/or classifying advertisements, while only certain categories in the standard taxonomy are used to perform such tasks. Further, interoperability between multiple applications is enabled by maintaining a common, standard taxonomy in a single repository such that newly-added categories to the standard taxonomy can be incorporated into the taxonomic views of the various applications by updating the tagged categories for a particular entity.

In one example, a number of advertisers may participate in an advertising exchange, such as a group of advertisers that are merchants seeking to perform targeted advertising. Each of the merchants participating in the advertising exchange may have an established "legacy" product catalog that expresses their own taxonomy of products (i.e. the merchant's own set of categories and/or descriptors). In order for the merchant to establish interoperability with the activities of the advertising exchange, and to participate in targeted advertising, the individual merchant may need to establish communication between its own legacy product catalog and the standard taxonomy of the advertising exchange. Accordingly, in embodiments of the invention, a merchant maps the categories in its legacy taxonomy to the standard taxonomy of the advertising exchange. A taxonomy slicer is then applied to the mapped categories to create a view of the standard taxonomy corresponding to the merchant's legacy taxonomy (product catalog).

Figure 2:
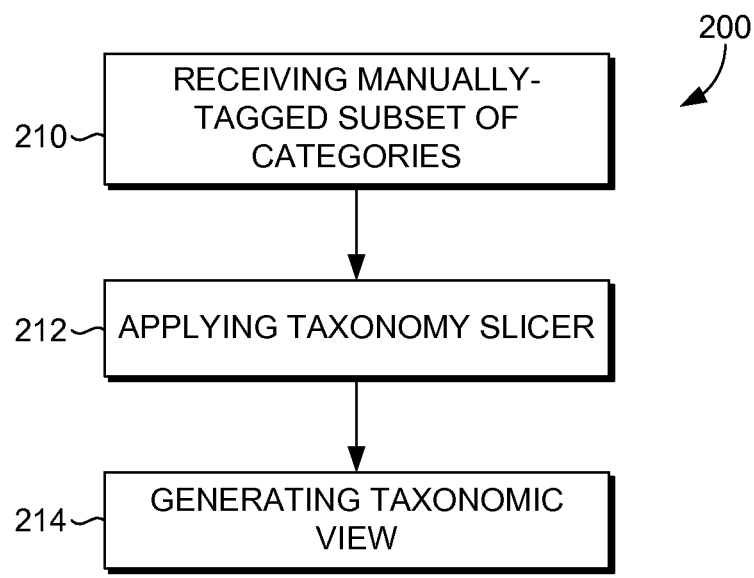
FIG. 2 is a flow diagram showing an exemplary method for generating a taxonomic view from a standard taxonomy, in accordance with an embodiment of the present invention.

Referring next to FIG. 2, a flow diagram 200 depicts a method for generating a view of a standard taxonomy, according to an embodiment of the invention. At block 210, a manually-tagged subset of categories is received. The plurality of categories in the subset of categories may be tagged based on an entity. In one embodiment, an arbitrary subset of categories in a standard taxonomy is manually tagged based on an entity's legacy taxonomy. For example, an entity may manually map the categories in the entity's legacy taxonomy (e.g., a legacy taxonomy of categories related to the entity, such as a product catalog) to an application's standard taxonomy (e.g., an advertising exchange's standard taxonomy) by first selecting and/or providing an indication of selection of a subset of categories from the standard taxonomy that correspond to the entity's legacy taxonomy. Selecting the subset of categories from the standard taxonomy may be referred to as "tagging" the categories in the standard taxonomy. Further, an "arbitrary" subset of categories may include categories from the standard taxonomy that reside in different branches, levels, sections, etc., of the taxonomy, and are not directly related prior to the generation of a taxonomic view.

At block 212, a taxonomy slicer is applied to the received, tagged subset of categories. In embodiments, applying the taxonomy slicer comprises determining a relationship for each of the plurality of categories in the subset of categories based on a relationship for each of the categories in the standard taxonomy. For example, parent/child relationships may be assigned between each of the plurality of categories in the subset of categories and at least one other category in the subset of categories. Based on applying the taxonomy slicer, a taxonomic view is generated at block 214. In some embodiments, generating a taxonomic view includes communicating the taxonomic view to the entity. Further, a taxonomic view may be assembled to include each of the plurality of categories in the subset of categories, and may be arranged according to the assigned parent/child relationships of each category. In further embodiments, based on generating the taxonomic view, the entity may then interact with the application having the standard taxonomy.

For example, the entity may interact with an advertising exchange upon creation of a taxonomic view associated with the advertising exchange's standard taxonomy. Additionally, using a taxonomic view, the entity may interact with other entities having taxonomic views generated based on the standard taxonomy. In one example, a first taxonomic view may be generated for a first entity based on the first entity's legacy taxonomy corresponding to a standard taxonomy, while a second taxonomic view may be generated for a second entity based on the second entity's legacy taxonomy corresponding to the standard taxonomy. In each instance, the taxonomy slicer (or separate taxonomy slicers) may extract tagged categories from a subset of categories tagged by the individual entity based on which categories in the standard taxonomy correspond to the entity's legacy taxonomy. Additionally, because both the first taxonomic view and the second taxonomic view were derived from the same standard taxonomy, interoperability is maintained between the first entity and the second entity. In other words, although the first entity and the second entity have distinct, legacy taxonomies, by generation of taxonomic views for each entity based on the same, common standard taxonomy, the entities and/or applications run by either entity may interact with each other. In one embodiment, having generated a taxonomic view for an entity, a plurality of audience segments may be determined and/or defined based on applying a formal grammar to the taxonomic view.

Figure 3:
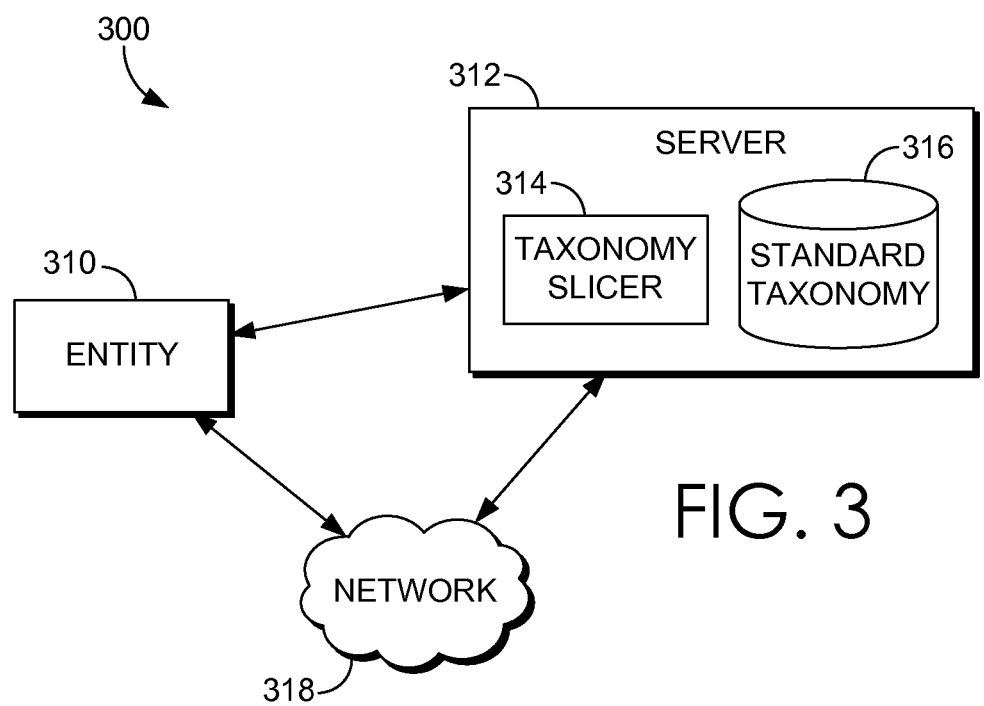
FIG. 3 is a block diagram of an exemplary computing system in which embodiments of the invention may be employed.

With reference to FIG. 3, a block diagram is provided illustrating an exemplary computing system 300 in which embodiments of the present invention may be employed. Generally, the computing system 300 illustrates an environment in which taxonomic views of a standard taxonomy may be generated. Among other components not shown, the computing system 300 generally includes a computing device 310, a server 312, a taxonomy slicer 314, and a standard taxonomy 316, all in communication with one another via network 318. The network 318 may include without limitation, one or more local area networks (LANs) and/or wide area networks (WANs). Such networking environments are commonplace in offices, enterprise-wide computer networks, intranets and the Internet. Accordingly, the network 318 is not further described herein.

It should be understood that any number of entity computing devices 310, servers 312, taxonomy slicers 314, and standard taxonomies 316 may be employed in the computing system 300 within the scope of embodiments of the present invention. Each may comprise a single device/interface or multiple devices/interfaces cooperating in a distributed environment. For instance, the server 312 may comprise multiple devices and/or modules arranged in a distributed environment that collectively provide the functionality of the server 312 described herein. Additionally, other components or modules not shown also may be included within the computing system 300.

In some embodiments, one or more of the illustrated components/modules may be implemented as stand-alone applications. In other embodiments, one or more of the illustrated components/modules may be implemented via the entity computing device 310, the server 312, or as an Internet-based service. It will be understood by those of ordinary skill in the art that the components/modules illustrated in FIG. 3 are exemplary in nature and in number and should not be construed as limiting. Any number of components/modules may be employed to achieve the desired functionality within the scope of embodiments hereof. Further, components/modules may be located on any number of servers and/or entity computing devices. By way of example only, the entity computing device 310 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The entity computing device 310 may include any type of computing device, such as the computing device 100 described with reference to FIG. 1, for example. Generally, the entity computing device 310 provides a tagged subset of categories from the standard taxonomy to the server 312. The server 312 of FIG. 3 is generally configured to receive a request for a taxonomic view from the entity computing device 310, including the tagged subset of categories, and to provide the taxonomic view to the computing device 310. As illustrated, the server 312 includes a taxonomy slicer 314 component and a standard taxonomy 316 database. Further, though illustrated as a single, independent component, the standard taxonomy 316 database may, in fact, be a plurality of storage devices, for instance a database cluster, portions of which may reside in association with the server 312, the entity computing device 310, another external computing device (not shown), and/or any combination thereof. The server 312, having one or more processors and one or more computer-readable storage media, is configured with a standard taxonomy 316 database coupled to the server. As discussed above, the server 312 is configured to receive a manually-tagged subset of categories of a standard taxonomy, with each of a plurality of categories in the subset of categories being tagged by an entity. The taxonomy slicer 314 is then applied to the manually-tagged subset to generate a taxonomic view of the standard taxonomy. The taxonomy slicer 314 is configured to determine a relationship for each of the plurality of categories in the subset of categories based on assigning a parent/child relationship between each of the plurality of categories in the subset of categories and at least one other category in the subset of categories. In determining the taxonomic view, the taxonomy slicer 314 assembles the categories in the taxonomic view according to the assigned parent/child relationships. Using server 312, the taxonomic view is then communicated to the entity computing device 310. In one embodiment, server 312 may be further configured to receive a plurality of categories extracted from the taxonomic view and to apply a formal grammar to the extracted plurality of categories to determine one or more audience segments.

In an embodiment of the invention, a standard taxonomy is tagged offline by an entity. The tagged categories in the standard taxonomy may then be transmitted, via an application programming interface (API), to the taxonomy slicer (via the server) which extracts the tagged categories from the standard taxonomy and assigns relationships between the extracted/tagged categories that are consistent with the relationships between such categories in the standard taxonomy. The generated taxonomic view may then be communicated back to the entity via an API.

In another example, an online consortium of online companies may establish a standard taxonomy for sharing between the companies. Each online company may require access to the standard taxonomy, but as discussed above, may want to continue use of legacy categories in the online company's legacy taxonomy. Accordingly, each online company in the online consortium may utilize the taxonomy slicer to generate a taxonomic view of the standard taxonomy shared by the online companies participating in the online consortium. As such, taxonomic views may be created which establish a representation of how the standard taxonomy corresponds to the legacy taxonomy of each online company. In embodiments, an online repository may be generated for the standard taxonomy, and an API may be established for communicating with the standard taxonomy such that individual entities (e.g., online companies seeking to participate in an online consortium) may request and retrieve taxonomic views corresponding to their individual, legacy taxonomies.

In another embodiment, an online consortium of two online entities have established an internet searching and advertisement agreement. As such, the two entities may need to be able to communicate with each other regarding the content of the advertisements provided by either of the two online entities. Additionally, the advertisements may need to be classified in the same way, using the same taxonomy. Accordingly, in one example, the two online entities may agree upon a single, standard taxonomy, with each of the entities generating a taxonomic view of the standard taxonomy that corresponds to their legacy taxonomy. The entities may communicate with each other by maintaining a standard taxonomy in a repository on a server, and communicating with that server using an API to 1) tag categories in the standard taxonomy (and/or upload tagged sets of categories), and 2) retrieve taxonomic views of the standard taxonomy that were generated by the server. As such, each entity's taxonomic view of the standard taxonomy (that is commonly accessed by each entity using an API) may relate back to the individual's legacy taxonomy.

In some embodiments, two entities may agree upon a single, standard taxonomy for each entity to generate a taxonomic view that corresponds to the entity's legacy taxonomy. In another example, a single entity may establish its own legacy taxonomy as a standard taxonomy, which is accessed by a second entity for generating a taxonomic view corresponding to the second entity's legacy taxonomy. As such, the first and second entities may communicate according to the same standard taxonomy.

While an entity's taxonomic view represents how an entity's legacy taxonomy corresponds to a standard taxonomy, the standard taxonomy does not contain all of the categories that are needed for behavioral targeting, and there are no formal rules for interpreting combinations of the categories from the standard taxonomy. As such, manual intervention is typically required to specify meanings which lack categories in the standard taxonomy, and to specify what meanings categories have when they are combined with other categories. Accordingly, in embodiments of the invention, a formal grammar provides a set of rules for defining a well-formed audience-targeting segment and/or behavioral targeting segment. For example, a formal grammar may be used to define audience segments for a standard taxonomy that includes a plurality of categories. In embodiments, the formal grammar is applied to the plurality of categories to direct the combination of a plurality of categories in the standard taxonomy, thereby forming well-formed, individual audience segments. In one example, categories in the standard taxonomy are combined using operators, according to the formal grammar, to generate single expressions for particular audience segments.

In one embodiment, a formal grammar is applied to a standard taxonomy having a plurality of categories. The formal grammar comprises one or more rules for combining categories in the standard taxonomy to create well-formed audience segments. For example, a "used cars" category and a "buyers" category may be two separate categories in a standard taxonomy. A well-formed audience segment for "used car buyers" may be generated based on applying the formal grammar to the standard taxonomy. In some embodiments, because well-formed audience segments are created based on applying the rules from the formal grammar to a standard taxonomy, the audience segments may be programmatically applied in determining which users satisfy a particular audience segment.

Figure 4:
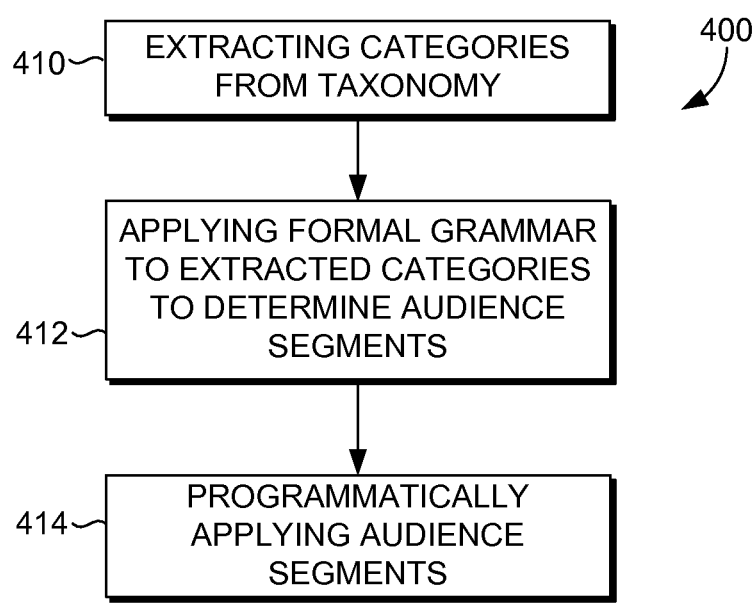
FIG. 4 is a flow diagram showing an exemplary method for applying a formal grammar to generate audience segments, in accordance with an embodiment of the present invention.

With reference to FIG. 4, a flow diagram 400 depicts a method for applying a formal grammar to generate audience segments from a standard taxonomy. At block 410, categories are extracted from a taxonomy. For example, a "used cars" category and a "buyers" category may be extracted from a standard taxonomy. In further embodiments, categories are extracted from a taxonomic view of a standard taxonomy. At block 412, a formal grammar may be applied to the extracted categories to determine audience segments. In some embodiments, a formal grammar will specify that a combination of two or more extracted categories from a standard taxonomy are to be interpreted as the intersection of these categories, to provide arbitrarily-complex audience segments. In other words, categories may be combined to target a particular audience or segment according to several factors that would not be part of the standard taxonomy and/or the taxonomic view. For example, a formal grammar may be applied to extracted categories for "used cars," "buyers," and "location of Seattle," in order to specifically target the intersection of users that are not only interested in used cars, but are specifically interested in purchasing a used car and have residence and/or an identified interest in a particular location such as Seattle. Accordingly, at block 414, the audience segments are programmatically applied to determine one or more users that satisfy a particular audience segment. In some embodiments, arbitrarily complex audience segments may be determined using the formal grammar, and may be applied programmatically during behavioral targeting. For example, an arbitrarily complex audience segment may refer to an audience segment that combines categories from a standard taxonomy and/or taxonomic view based on applying a formal grammar, which specifies rules for interpreting combinations of categories that are different from any relationships that these categories have within a taxonomy or any view of the taxonomy. In connecting such categories, indicators such as user intent may be combined with product categories, location categories, and the like.

Figure 5:
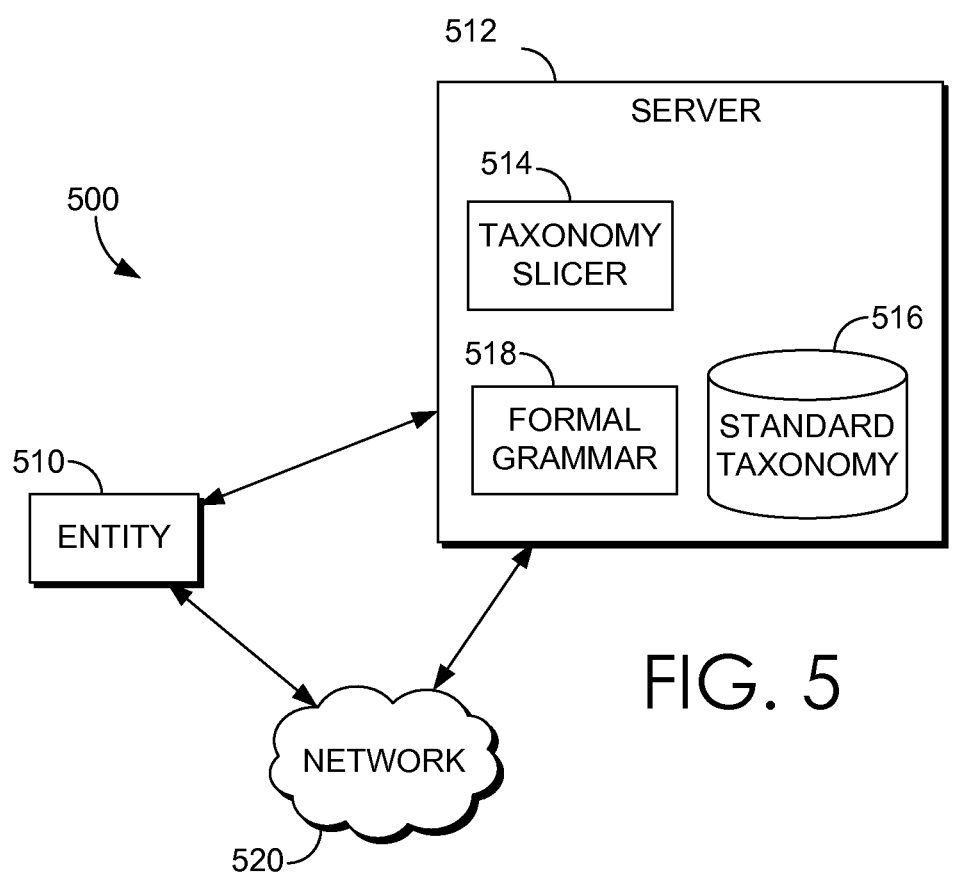
FIG. 5 is a block diagram of an exemplary computing system in which embodiments of the invention may be employed.

Turning now to FIG. 5, a block diagram is provided illustrating an exemplary computing system 500, in which embodiments of the present invention may be employed. Generally, the computing system 500 illustrates an environment for applying a formal grammar to a taxonomy to determine audience segments. Among other components not shown, the computing system 500 generally includes an entity computing device 510, a server 512, a taxonomy slicer 514, a standard taxonomy 516, a formal grammar 518, and a network 520. The network 520 may include without limitation, one or more local area networks (LANs) and/or wide area networks (WANs). Such networking environments are commonplace in offices, enterprise-wide computer networks, intranets and the Internet. Accordingly, the network 520 is not further described herein.

It should be understood that any number of entity computing devices 510, servers 512, taxonomy slicers 514, standard taxonomies 516, and formal grammar 518 databases may be employed in the computing system 500 within the scope of embodiments of the present invention. Each may comprise a single device/interface or multiple devices/interfaces cooperating in a distributed environment. For instance, the server 512 may comprise multiple devices and/or modules arranged in a distributed environment that collectively provide the functionality of the server 512 described herein. Additionally, other components or modules not shown also may be included within the computing system 500.

In some embodiments, one or more of the illustrated components/modules may be implemented as stand-alone applications. In other embodiments, one or more of the illustrated components/modules may be implemented via the entity computing device 510, the server 512, or as an Internet-based service. It will be understood by those of ordinary skill in the art that the components/modules illustrated in FIG. 5 are exemplary in nature and in number and should not be construed as limiting. Any number of components/modules may be employed to achieve the desired functionality within the scope of embodiments hereof. Further, components/modules may be located on any number of servers and/or entity computing devices. By way of example only, the entity computing device 510 might be provided as a single computing device (as shown), a cluster of computing devices, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The entity computing device 510 may include any type of computing device, such as the computing device 100 described with reference to FIG. 1, for example. The server 512 of FIG. 5 is generally configured to apply a formal grammar to categories of a taxonomy and determine audience segments for targeting. The formal grammar 518 component provides, as discussed above, rules for assigning a meaning to the expression including selected categories from the taxonomy (i.e. combinations of descriptors). In other words, in some embodiments, categories corresponding to a particular audience segment may be selected manually, such as an advertiser selecting to target the categories "residents of Seattle" and "used cars." However, once the categories are selected, the expression consisting of these categories ("residents of Seattle" and "used cars") would be assigned a specific meaning based on the formal grammar. In some embodiments, the formal grammar is applied to categories extracted from the standard taxonomy 516 database. In other embodiments, the formal grammar is applied to categories of the taxonomic view generated according to the methods described above.

Generally, the entity computing device 510 provides a tagged subset of categories from the standard taxonomy to the server 512. The server 512 includes a taxonomy slicer 514 component and a standard taxonomy 516 database. As discussed above, the server 512 is configured to receive a manually-tagged subset of categories of a standard taxonomy, with each of a plurality of categories in the subset of categories being tagged by an entity. The taxonomy slicer 514 is then applied to the manually-tagged subset to generate a taxonomic view of the standard taxonomy. Accordingly, in some embodiments, defined audience segments may be generated based on tagged categories in the subset of categories used to determine the taxonomic view.

As can be understood, embodiments of the present invention provide systems, methods, and computer-readable storage media for, among other things, generating a taxonomic view from a standard taxonomy and generate audience segments for targeting using a formal grammar. The present invention has been described in relation to particular embodiments, which are intended in all respects to be illustrative rather than restrictive. Alternative embodiments will become apparent to those of ordinary skill in the art to which the present invention pertains without departing from its scope. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in methods 200 of FIG. 2 and 400 of FIG. 4 is not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. A computerized method for generating a taxonomic view of a standard taxonomy usable for behavioral targeting of one or more users by at least one entity, the method comprising:
   receiving a subset of categories of the standard taxonomy from the at least one entity, wherein each category in the subset of categories is tagged based on a legacy taxonomy of the at least one entity;
   applying a taxonomy slicer to the subset of categories to reassemble the standard taxonomy that includes categories that were manually-tagged;
   generating the taxonomic view of the standard taxonomy that includes the categories that were manually-tagged based at least in part on connecting a plurality of the subset of categories of the standard taxonomy with their respective closest ancestors within the standard taxonomy when at least one parent of at least one category of the categories that were manually-tagged is not manually-tagged; and
   applying a formal grammar to the taxonomic view to determine an audience segment, wherein the formal grammar comprises one or more rules for interpreting relationships between two categories in the taxonomic view.

2. The computerized method of claim 1, wherein applying the taxonomy slicer to the subset of categories comprises:
   determining relationships for categories in the subset of categories based on relationships for corresponding categories in the standard taxonomy.

3. The computerized method of claim 2, wherein the determining the relationships for the categories in the subset of categories comprises assigning parent-child relationships in the subset of categories.

4. The computerized method of claim 3, wherein each of the categories in the taxonomic view is assembled according to the parent-child relationships.

5. The computerized method of claim 4, wherein each of the parent-child relationships in the taxonomic view are determined by a parent or ancestor relationship in the standard taxonomy.

6. The method of claim 1, wherein the formal grammar comprises one or more rules for combining two or more categories in the standard taxonomy to determine the audience segment for the behavioral targeting.

7. The method of claim 6, wherein the two or more categories in the standard taxonomy indicates an intent of the audience segment.

8. A computer memory storing computer-useable instructions that, when accessed by one or more computing devices, cause the one or more computing devices to perform a method for applying a formal grammar to define one or more audience segments, the method comprising:
   applying a taxonomy slicer to a plurality of categories from a taxonomy to generate a taxonomic view of the taxonomy by directly connecting at least two categories of the plurality of categories that are not directly connected in the taxonomy;
   applying the formal grammar to the taxonomic view to determine the one or more audience segments, wherein the formal grammar comprises one or more rules for interpreting a combination of two or more categories from the taxonomic view; and
   applying the one or more audience segments in determining one or more users that satisfy the combination of the two or more categories from the taxonomic view during behavioral targeting of the one or more users by at least one entity.

9. The computer memory of claim 8, wherein the taxonomy comprises a standard taxonomy.

10. The computer memory of claim 8, wherein the taxonomic view is based on a plurality of tagged categories from a standard taxonomy.

11. The computer memory of claim 10, further comprising:
    receiving a subset of categories of the standard taxonomy, wherein each of categories in the subset of categories is tagged by an entity;
    applying the taxonomy slicer to the subset of categories of the standard taxonomy; and
    generating the taxonomic view of the standard taxonomy.

12. The computer memory of claim 8, wherein the formal grammar further comprises rules for combining the two or more categories in the taxonomy.

13. The computer memory of claim 8, wherein the combination of the two or more categories from the taxonomy comprises an intersection of the two or more categories from the taxonomy.

14. A system for generating a taxonomic view of a standard taxonomy usable for behavioral targeting of one or more users by at least one entity, the system comprising:
    a server having one or more processors and one or more computer memories; and
    a data store coupled with the server, wherein the server:
    (1) receives a subset of categories of the standard taxonomy, wherein each of a plurality of categories in the subset of categories is tagged by an entity based on each category in a legacy taxonomy of the entity corresponding to one or more categories in the standard taxonomy;
    (2) applies a taxonomy slicer to the subset of categories of the standard taxonomy to generate the taxonomic view of the standard taxonomy by directly connecting at least two manually-tagged categories that are not directly connected in the standard taxonomy;
    (3) applies a formal grammar to the taxonomic view to determine one or more audience segments, wherein the formal grammar comprises one or more rules for interpreting a combination of two or more categories from the standard taxonomy; and
    (4) applies the one or more audience segments to determine the one or more users that satisfy the combination of the two or more categories from the standard taxonomy during the behavioral targeting of the one or more users by the at least one entity.

15. The system of claim 14, wherein the server determines a relationship for each of the plurality of categories in the subset of categories based on assigning parent-child relationships between each of the plurality of categories in the subset of categories and at least one other category in the subset of categories.

16. The system of claim 15, wherein categories in the taxonomic view are assembled according to the parent-child relationships.

17. The system of claim 16, wherein each of the parent-child relationships are determined by a parent or ancestor relationship in the standard taxonomy.

18. The system of claim 17, wherein the server programmatically applies the one or more audience segments during the behavioral targeting.

19. The system of claim 14, wherein the server communicates the taxonomic view to the entity.

20. The system of claim 14, wherein the taxonomic view comprises each of the plurality of categories in the subset of categories.

* * * * *